(12) United States Patent
Joaquin et al.

(10) Patent No.: US 6,908,145 B2
(45) Date of Patent: Jun. 21, 2005

(54) VEHICLE PASSENGER COMPARTMENT COMPONENTS AND MANUFACTURING PROCESS FOR MAKING THE SAME

(75) Inventors: Armando Mateo Joaquin, Rochester Hills, MI (US); Matthew John Zaluzec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,694

(22) Filed: Feb. 10, 2003

(65) Prior Publication Data

US 2004/0155487 A1 Aug. 12, 2004

(51) Int. Cl.$^7$ ............................................. B62D 25/20
(52) U.S. Cl. ................... 296/193.07; 29/897.2
(58) Field of Search ...................... 296/193.07, 204; 29/428, 897.2

(56) References Cited

U.S. PATENT DOCUMENTS

| | | | | | |
|---|---|---|---|---|---|
| 2,597,837 | A | * | 5/1952 | Lindsay ................... | 296/181.4 |
| 3,661,419 | A | * | 5/1972 | Mitamura et al. ..... | 296/203.04 |
| 3,874,471 | A | * | 4/1975 | Kloefkorn .................. | 180/69.4 |
| 4,511,176 | A | * | 4/1985 | Watanabe et al. ........... | 296/204 |
| 4,514,008 | A | * | 4/1985 | Watanabe et al. ........... | 296/204 |
| 4,679,820 | A | * | 7/1987 | Srock et al. ................. | 280/781 |
| 4,986,597 | A | * | 1/1991 | Clausen ....................... | 296/205 |
| 5,002,333 | A | * | 3/1991 | Kenmochi et al. .......... | 296/204 |
| 5,829,664 | A | | 11/1998 | Spinella et al. | |
| 6,234,568 | B1 | * | 5/2001 | Aoki ..................... | 296/203.04 |
| 6,250,037 | B1 | | 6/2001 | Ezumi et al. | |
| 6,273,323 | B1 | | 8/2001 | Ezumi et al. | |
| 6,305,866 | B1 | | 10/2001 | Aota et al. | |
| 6,315,187 | B1 | | 11/2001 | Satou et al. | |
| 6,386,425 | B2 | | 5/2002 | Kawasaki et al. | |
| 6,419,144 | B2 | | 7/2002 | Aota et al. | |
| 6,422,449 | B1 | | 7/2002 | Ezumi et al. | |
| 6,431,641 | B2 | * | 8/2002 | Miyasaka ............... | 296/203.03 |
| 2001/0007717 | A1 | | 7/2001 | Ezumi et al. | |
| 2001/0010855 | A1 | | 8/2001 | Aota et al. | |
| 2001/0011674 | A1 | | 8/2001 | Ezumi et al. | |
| 2001/0023567 | A1 | | 9/2001 | Ezumi et al. | |
| 2001/0030222 | A1 | | 10/2001 | Konno et al. | |
| 2002/0027154 | A1 | | 3/2002 | Satou et al. | |
| 2002/0028341 | A1 | | 3/2002 | Ezumi et al. | |
| 2002/0030082 | A1 | | 3/2002 | Ezumi et al. | |

FOREIGN PATENT DOCUMENTS

| | | | | | |
|---|---|---|---|---|---|
| JP | 01022681 | A | * | 1/1989 | ................. 296/204 |
| JP | 01047683 | A | * | 2/1989 | ................. 296/204 |
| JP | 05097065 | A | * | 4/1993 | ................. 296/204 |
| JP | 06206580 | A | * | 7/1994 | ................. 296/204 |

OTHER PUBLICATIONS

Proceedings for the Dedicated Conference on New and Alternative Materials for the Transportation Industries, 27$^{th}$ ISATA, 1994, Aachen, Germany Oct. 31$^{st}$–Nov. 4$^{th}$.

Midling, O.T., Material Flow Behavior and Microstructural Integrity of Friction Stir Butt Weldments, The 4$^{th}$ International Conference on Aluminum Alloys, pp. 451–458.

* cited by examiner

*Primary Examiner*—D. Glenn Dayoan
*Assistant Examiner*—Paul Chenevert
(74) *Attorney, Agent, or Firm*—Raymond L. Coppiellie; Brooks & Kushman, P.C.

(57) ABSTRACT

A process or method of making a vehicle passenger compartment floor component such as a central tunnel or rocker panel. Base extrusion pieces and upper pieces are secured by a friction stir welding process to each other and to a portion of a passenger compartment floor. Upper pieces may be formed by extrusion or may be formed by a sheet forming process and secured to base extrusion pieces by means of the friction stir welding process.

20 Claims, 3 Drawing Sheets

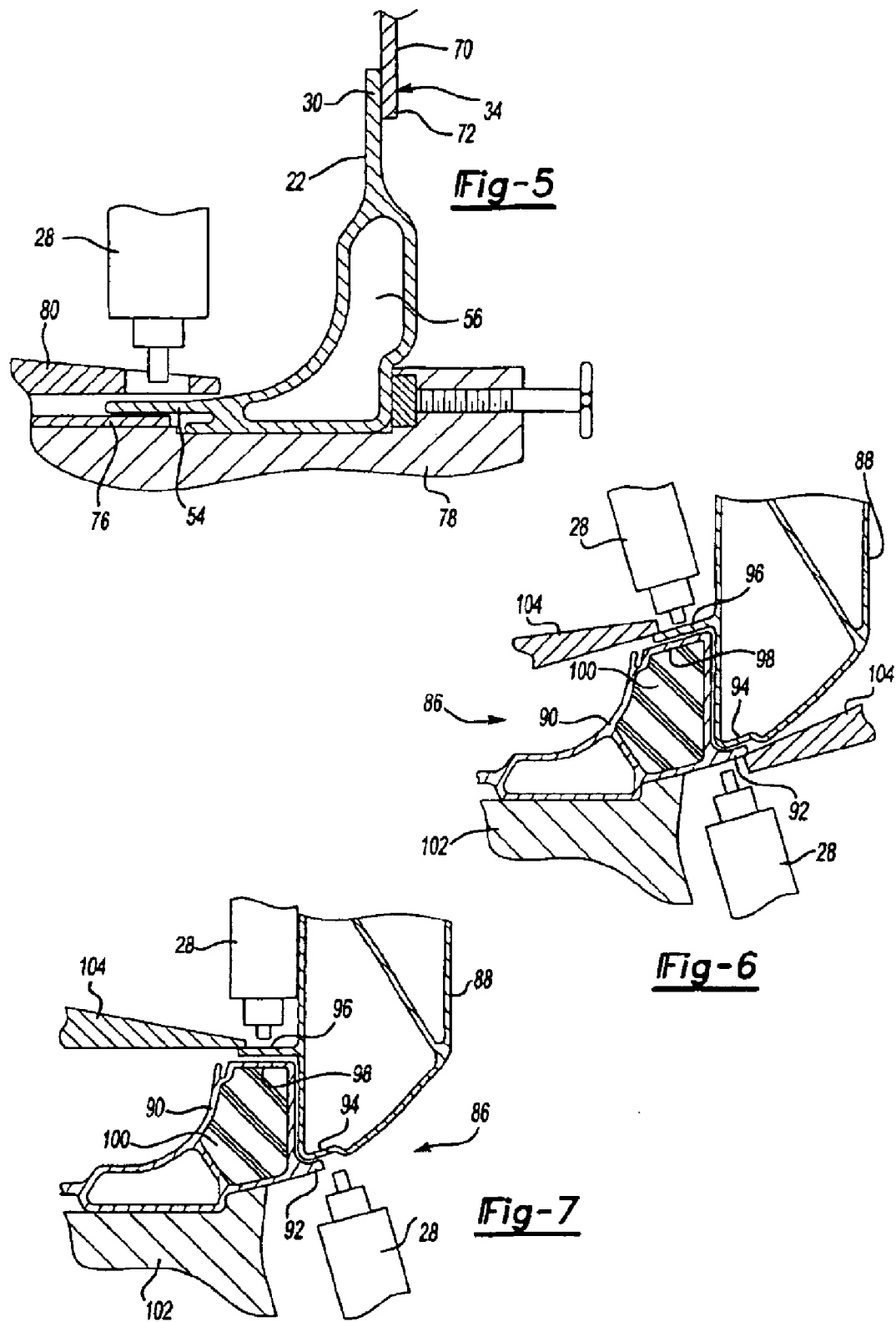

VEHICLE PASSENGER COMPARTMENT COMPONENTS AND MANUFACTURING PROCESS FOR MAKING THE SAME

BACKGROUND OF INVENTION

1. Field of the Invention

The present invention relates to structural vehicle parts manufactured by friction stir welding several parts together including extrusions that are combined to form larger structural body parts.

2. Background Art

In an effort to improve fuel economy by reducing vehicle weight, vehicle manufacturers have increasingly turned to aluminum parts. Aluminum parts may be made from aluminum sheets that are fabricated by conventional sheet metal forming and assembly processes. Aluminum extrusions are generally used to form smaller cross-section bars and reinforcements. The size of aluminum extrusions is limited due to problems associated with larger cross-section extruded aluminum parts.

It has not previously been economically feasible to form large structural components such as center tunnel and rocker beams using an extrusion process. For example, it has not been cost effective to make a center tunnel measuring 12 inches on a side or rocker beam having a cross-section including a dimension of 8 to 10 inches solely by an aluminum extrusion process.

The center tunnel of a vehicle may be used to house a gasoline tank or other fuel system components that require the tunnel to be sealed. If the tunnel is manufactured in sections, a continuous weld must be made to assure sealing. Prior art MIG or TIG welding operations must be performed intermittently due to the high heat developed that may cause substantial distortion of the panels to be joined. Panels must be MIG or TIG welded in spaced stitches on a first pass and then MIG or TIG welded on a second pass after allowing the panels to cool to connect the spaced stitches of the first pass to form an acceptable continuous MIG or TIG weld.

Another disadvantage associated with MIG or TIG welding is that both require filler metal to form a weld. Filler metal adds to the cost and weight of finished parts.

These and other problems associated with prior art structural component parts and manufacturing processes are addressed by applicants' invention as summarized below.

SUMMARY OF INVENTION

According to one aspect of the invention, a vehicle passenger compartment floor component such as a central tunnel or rocker panel is made by extruding a base extrusion piece having a floor connection flange, forming an upper piece, friction stir welding the base extrusion piece to the upper piece, and friction stir welding the floor connection flange to a portion of a passenger compartment floor. Friction stir welding is an autogenous welding process that does not require filler metal, and thus reduces cost and weight.

According to other aspects of the invention, the product made according to the process may include providing two base extrusion pieces that are friction stir welded to the upper piece to form a longitudinally extending central tunnel. The upper piece may be formed by extruding two extrusions that are assembled together longitudinally along a top portion of a longitudinally extending tunnel. The two extrusions forming the upper piece may be joined together in opposite orientation as mirror image extrusions. Alternatively, the upper piece may be formed from a metal sheet by forming longitudinally extending bends in the sheet wherein at least two spaced downwardly extending flanges are formed and wherein two base extrusion pieces are friction stir welded to the two downwardly extending flanges. The upper piece may be formed as an extrusion having at least two spaced downwardly extending flanges to which two base extrusion pieces are friction welded.

According to another aspect of the invention, the base extrusion piece may comprise a lower part of a rocker panel and the upper piece may comprise an upper part of the rocker panel. The base extrusion of the rocker panel has an outwardly extending joining flange that is assembled to a wall of the upper piece before friction stir welding. The upper piece may also have an inwardly extending joining flange that is assembled to a wall of the base extrusion before friction stir welding the upper piece and base extrusion piece together.

According to a further aspect of the invention, a process is provided for manufacturing a vehicle passenger compartment floor component. The process comprises extruding at least one base extrusion piece having a floor connection flange forming at least one upper piece, friction stir welding the base extrusion piece to the upper piece, and friction stir welding the floor connection flange to a portion of a passenger compartment floor.

According to additional aspects of the invention, the passenger compartment floor includes a tunnel and first and second rocker panels that each extend in a longitudinal direction. The tunnel is connected by a first floor panel to the first rocker panel and by a second floor panel to the second rocker panel.

The process includes making a tunnel by extruding a pair of tunnel base extrusions and extruding at least one upper piece with the rocker panels each being made by extruding a rocker panel base extrusion piece and a rocker panel upper piece. The tunnel base extrusions are friction stir welded to the tunnel upper piece and the rocker panel base extrusions are friction stir welded to the rocker panel upper pieces. The process also may include friction stir welding each of the tunnel base extrusions to one of the first and second floor panels.

According to another aspect of the invention, a method of manufacturing a compartment pan for a vehicle is provided. The method includes extruding first and second tunnel base pieces and forming an upper tunnel piece. First and second tunnel pieces are friction stir welded to the upper tunnel piece. At least two floor sections are formed and the floor pieces are friction stir welded to the first and second tunnel base pieces. First and second rocker panels are extruded and each are stir welded to one of the floor sections at a spaced location relative to the tunnel base pieces.

According to other aspects of the method of making a compartment pan, the upper tunnel piece may be formed by extruding a left and right section and friction stir welding the right and left sections together. Alternatively, the upper tunnel piece may be formed by bending a sheet metal blank to a desired shape. The method may also comprise forming rocker panels by extruding an upper rocker section and a lower rocker section that are welded together by friction stir welding.

These and other aspects of the present invention will be better understood in view of the attached drawings and following detailed description of the specifically disclosed embodiments of the invention.

BRIEF DESCRIPTION OF DRAWINGS

FIG. 5 is a cross-sectional view of a base extrusion ready to be friction stir welded to a compartment pan floor panel;

FIG. 6 is a cross-sectional view of a rocker panel made in two parts and in position for friction stir welding to join the two parts together; and FIG. 7 is a cross-sectional view showing an alternative rocker panel construction in position for assembly in joining by friction stir welding.

DETAILED DESCRIPTION

Figure 1:
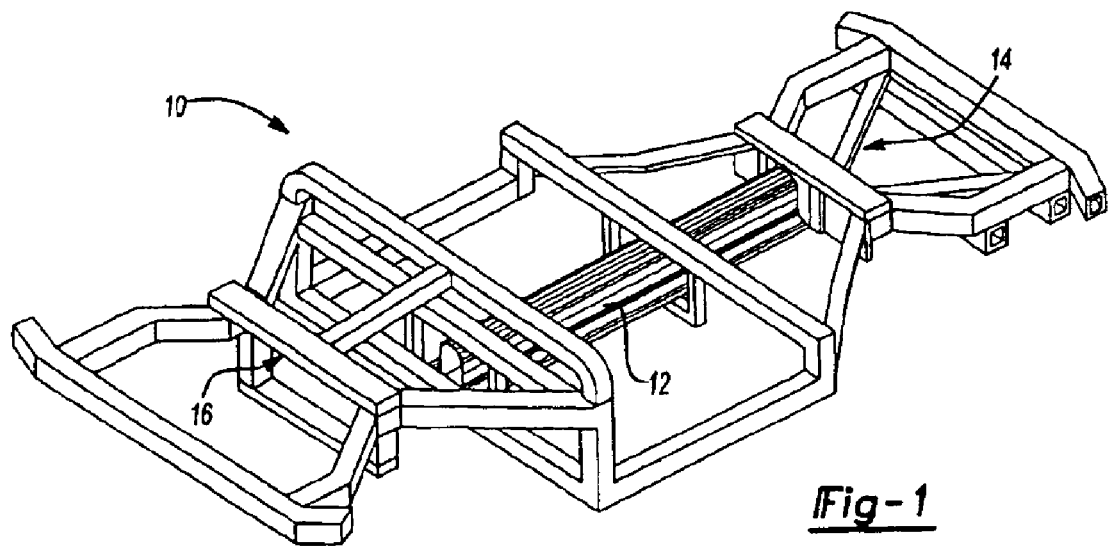
FIG. 1 is a perspective view of a vehicle frame including a center tunnel made according to the present invention.

Referring now to FIG. 1, a vehicle frame 10 made in accordance with the present invention is shown with a central tunnel 12 extending between a front frame section 14 and a rear frame section 16. The central tunnel 12 extends in a longitudinal direction and is constructed of an aluminum alloy as will be more fully described below. Suitable aluminum alloys comprise 5XXX and 6XXX alloys having a thickness of between 1 mm and 25 mm.

Figure 2:
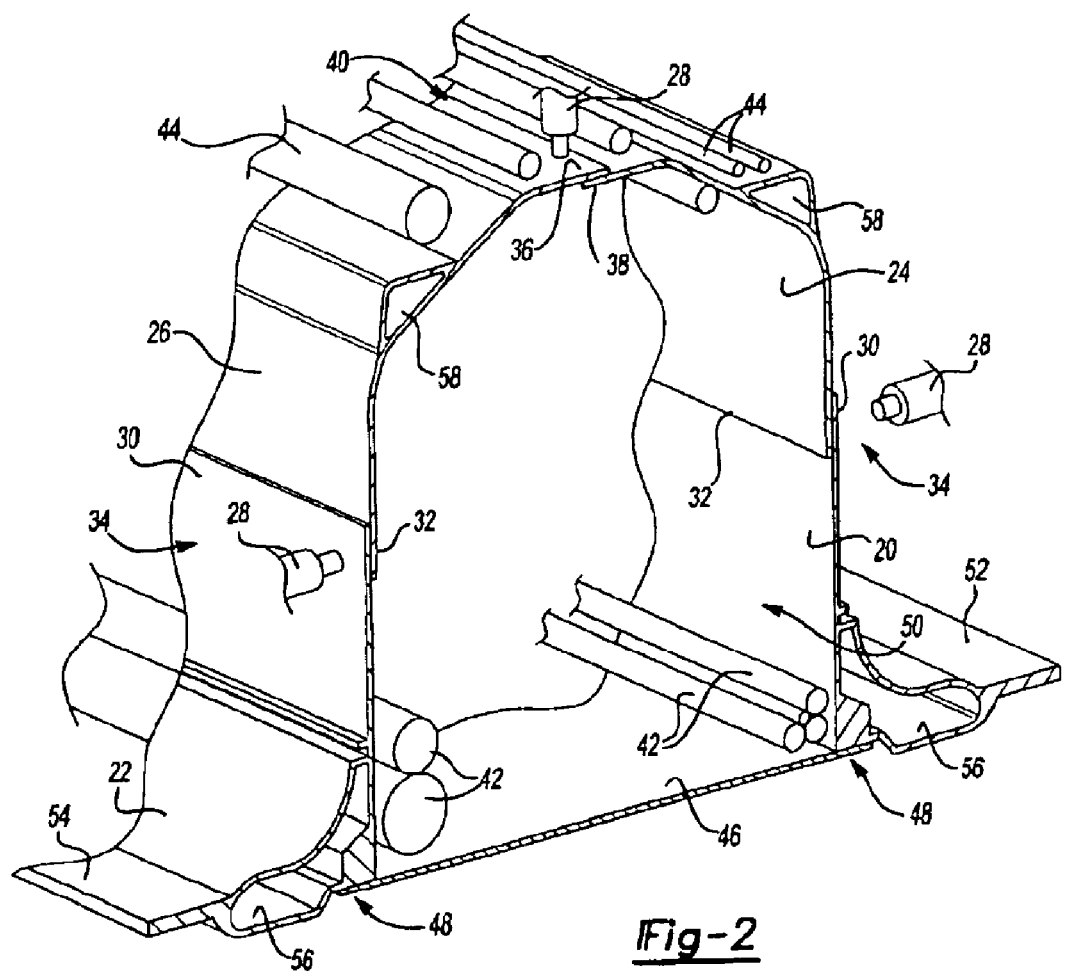
FIG. 2 is a fragmentary perspective view of a vehicle tunnel made according to one embodiment of the invention.

Referring now to FIG. 2, the central tunnel 12 comprises a right base extrusion piece 20 and a left base extrusion piece 22 that are joined, respectively, to a right upper extrusion piece 24 and a left upper extrusion piece 26. The extrusion pieces 20, 22, 24 and 26 are joined by a friction stir welding process wherein a friction stir welding tool 28 is used to weld the extrusion pieces 20, 22, 24 and 26 together. An inherent feature of the disclosed welding process is that a continuous weld is formed that seals fumes out of the passenger compartment.

An upper portion 30 of the base extrusion pieces 20, 22 is joined to a lower portion 32 of the upper extrusion pieces 24 and 26, respectively. A side lap weld area 34 is located where the upper portions 30 and lower portions 32 overlap each other. The right upper extrusion piece 24 includes a first inwardly extending portion 38 and the left upper extrusion piece 26 includes a second inwardly extending portion 36 that are overlapped in a top lap weld area 40. The friction stir welding tool 28 is inserted into the lap weld areas 34, 40 and moved longitudinally to form a friction stir weld joining the extrusion pieces together.

The central tunnel 12 accommodates internal tubes 42 that extend generally from the front frame section 14 to the rear frame section 16. Tubes 42, or conduits, for vehicle heating and cooling systems, radiator or an inter coolant may be provided within the central tunnel. The central tunnel may also provide a space for the vehicle fuel tank (not shown). External tubes 44 are shown secured to the outer surface of the central tunnel 12. The external tubes 44 may be provided for vehicle wiring, shift cables, or throttle cables.

The central tunnel 12 may also be provided with a tunnel base closure panel 46 that connects the right and left base extrusion pieces 20 and 22. The tunnel base closure panel 46 is provided with base closure panel lap weld areas 48 wherein a friction stir welding tool 28 may be used to join the closure panel 46 to the extrusion pieces 20 and 22. A sealed internal space 50 is provided within the central tunnel 12. Instead of friction stir welding, the tunnel base closure panel 46 could be secured to the lower part of the central tunnel 12 by fasteners to allow access to the central tunnel 12 for service or final assembly.

Right base extrusion piece 20 includes a first floor connection flange 52 and left base extrusion piece 22 has a second floor connection flange 54. The floor connection flanges 52 and 54 are adapted to be connected to a floor section of a vehicle compartment pan as will be more specifically described below with reference to FIG. 5.

Base reinforcement pockets 56 are provided on each of the base extrusion pieces 20 and 22 to strengthen the central tunnel 12. The pockets 56 are hollow to reduce weight while still providing substantial reinforcement to the central tunnel 12. Upper portion reinforcement pockets 58 are similarly provided on the upper extrusion pieces 24 and 26 to provide additional rigidity on the upper corners of the central tunnel 12.

Figure 3:
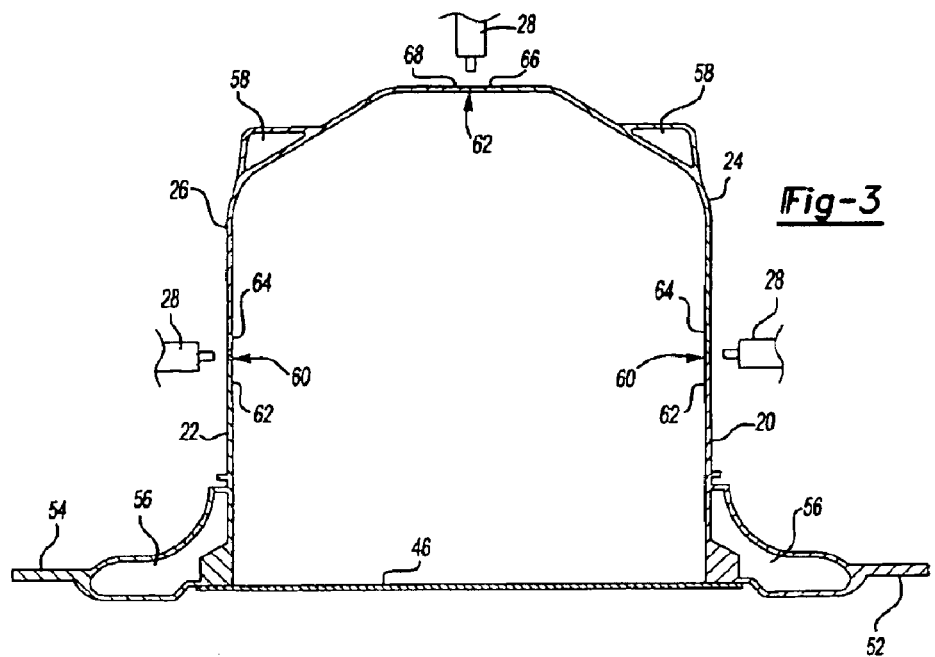
FIG. 3 is a cross-sectional view of a vehicle tunnel having butt welded friction stir welded joints between base extrusions and upper pieces that are also joined together by a butt welded friction stir welding joint.

Referring now to FIG. 3, an alternative embodiment of the central tunnel is shown. The same numerals are used in FIG. 3 to refer to parts previously identified in FIG. 2. The embodiment of FIG. 3 is substantially similar to FIG. 2 except that the extrusions are joined together with butt welds. A butt weld area 60 is provided between an upper edge 62 of the base extrusion panels 20 and 22 and a lower edge 64 of the upper extrusion pieces 24 and 26. A first inner edge 66 of right upper extrusion piece 24 and a second inner edge 68 of left upper extrusion piece 26 define a butt weld area 62. Welds are formed by the friction stir welding tool 28 in the butt weld areas 60, 62 by inserting the tool between adjacent edges.

Figure 4:
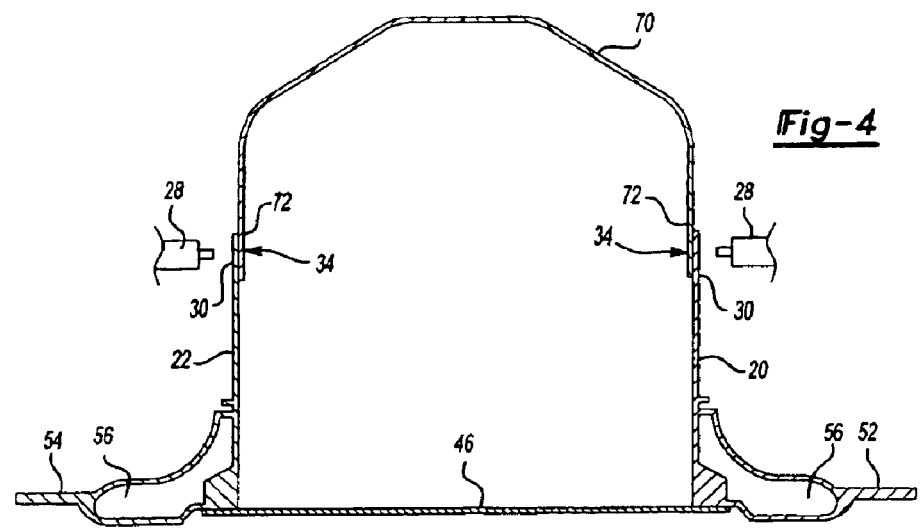
FIG. 4 is a cross-sectional view of a vehicle tunnel having two base extrusions that are friction stir welded to a fabricated upper piece.

Referring now to FIG. 4, an upper panel 70 is provided that is formed from an aluminum sheet instead of providing right and left upper extrusion pieces 24 and 26. The upper panel 70 may be formed by conventional sheet forming processes by using a bending brake to form longitudinally extending bends in upper panel 70. Lower portions 72 of the upper panel 70 are shown adjacent the upper portions 30 of the base extrusion pieces 20 and 22 thereby providing a side lap weld area 34. Upper panel 70 is joined to the base extrusion pieces 20 and 22 by means of a lap weld formed by the friction stir welding tool 28.

Referring now to FIG. 5, left base extrusion piece 22 is shown substantially in position for assembly to a compartment pan floor 76. The left base extrusion piece 22 and compartment pan floor 76 are placed in a fixture 78 with a clamp 80 holding the left base extrusion piece 22 against the compartment pan floor 76. A friction stir welding tool 28 engages the left base extrusion piece 22 and compartment pan floor 76 and is moved longitudinally to form a friction stir weld.

Referring now to FIGS. 6 and 7, a rocker panel generally indicated by reference numeral 86 is shown to include an upper part 88 and a lower part 90. The lower part 90 includes an outwardly extending joining flange 92 that is placed against a base wall 94 of the upper part 88. An inwardly extending joint flange 96 extends from the upper part 88 and is placed against a top wall 98 of the lower part 90. The friction stir welding tool 28 is used to form a friction stir weld between the outwardly extending joining flange 92 and base wall 94 and also between inwardly extending joint flange 96 and top wall 98. A mandrel 100 may be used to locate and secure the upper and lower part 90 in conjunction with a fixture 102 and a clamp 104. In FIG. 6, the flanges 92 and 96 are substantially parallel to each other and aligned so that two stir welding tools may be aligned to exert opposing forces on the two spaced flanges 92 and 96.

While the best mode for carrying out the invention has been described in detail, those familiar with the art to which this invention relates will recognize various alternative designs and embodiments for practicing the invention as defined by the following claims.

What is claimed is:

1. A vehicle passenger compartment floor component made according to a process, comprising:
   forming at least one base piece having a floor connection flange;
   forming at least one upper piece;
   friction stir welding the base piece to the upper piece to form a first continuous seam on a longitudinally extending tunnel of a passenger compartment floor that seals out fumes.

2. The vehicle passenger compartment floor component of claim 1 wherein two base pieces are provided that are friction stir welded to the upper piece to form a longitudinally extending tunnel.

3. The vehicle passenger compartment floor component of claim 1 wherein the upper piece is formed from a metal sheet by forming longitudinally extending bends in the sheet wherein at least two spaced downwardly extending flanges are formed and wherein two base extrusion pieces are friction welded to the two downwardly extending flanges.

4. The vehicle passenger compartment floor component of claim 1 wherein the upper piece is formed as an extrusion comprising at least two spaced downwardly extending flanges and wherein two base extrusion pieces are friction stir welded to the two downwardly extending flanges.

5. The vehicle passenger compartment floor component of claim 1 wherein the upper piece is formed by extruding two extrusions that are assembled together longitudinally along a top portion of a longitudinally extending tunnel.

6. The vehicle passenger compartment floor component of claim 5 wherein the two extrusions forming the upper piece are joined together in opposite orientation as minor image extrusions.

7. A vehicle passenger compartment floor, comprising:
   two base pieces that each have a longitudinally extending floor connection flange and a longitudinally extending reinforcement pocket;
   at least one upper piece, wherein each upper piece has a longitudinally extending upper reinforcement pocket;
   wherein each of the base pieces are welded to the upper piece at two spaced locations between the base reinforcement pocket and the upper reinforcement pocket on a longitudinally extending tunnel of a passenger compartment floor.

8. The vehicle passenger compartment floor of claim 7 wherein the upper piece is formed from a metal sheet by forming longitudinally extending bends in the sheet wherein at least two spaced downwardly extending flanges are formed and wherein two base pieces are welded to the two downwardly extending flanges.

9. The vehicle passenger compartment floor of claim 7 wherein the upper piece includes at least two spaced downwardly extending flanges and wherein two base pieces are welded to the two downwardly extending flanges.

10. The vehicle passenger floor of claim 7 further comprising a tunnel base closure panel joining the two base pieces at a location on each base piece that is spaced from the upper piece to define a sealed internal space within the longitudinally extending tunnel.

11. The vehicle passenger compartment floor of claim 7 wherein the upper piece is formed by two portions that are assembled together longitudinally along a top of the longitudinally extending tunnel.

12. The vehicle passenger compartment floor of claim 11 wherein the two portions forming the upper piece are joined together in opposite orientation as minor image portions.

13. The vehicle passenger floor of claim 7 further comprising a lower part of a rocker panel and an upper part of the rocker panel that are welded together to form a continuous longitudinally extending seam.

14. The vehicle passenger floor of claim 13 wherein the lower part of the rocker panel has an outwardly extending joining flange that is assembled to a wall of the upper part of the rocker panel before being welded together, the joining flange being spaced from the floor connection flange.

15. The vehicle passenger floor of claim 13 wherein the upper part of the rocker panel has an inwardly extending joining flange that is assembled to a wall of the lower part of the rocker panel before being welded together.

16. A process for manufacturing a vehicle passenger compartment floor, comprising:
    extruding at least one base extrusion piece;
    forming at least one upper piece;
    friction stir welding the base extrusion piece to the upper piece to form a longitudinally extending tunnel; and
    friction stir welding the base extrusion piece to a portion of a passenger component floor assembly.

17. The process of claim 16 wherein the vehicle passenger compartment floor includes a first and second rocker panels that extend in a longitudinal direction, the tunnel being connected by a first floor panel to the first rocker panel and by a second floor panel to the second rocker panel.

18. The process of claim 17, wherein the tunnel is made by extruding a pair of tunnel base extrusions and extruding at least one upper piece, and the rocker panels are each made by extruding a rocker panel base extrusion piece and a rocker panel upper piece.

19. The process of claim 18 wherein the tunnel base extrusions are friction stir welded to the tunnel upper piece and the rocker panel base extrusions are friction stir welded to the rocker panel upper pieces.

20. The process of claim 19 wherein each of the tunnel base extrusions are friction stir welded to one of the first and second floor panels.

* * * * *